(12) United States Patent
Spatafora et al.

(10) Patent No.: US 7,128,205 B2
(45) Date of Patent: Oct. 31, 2006

(54) TURN-AROUND DEVICE FOR PACKETS

(75) Inventors: Mario Spatafora, Bologna (IT);
Fabrizio Tale', Bologna (IT)

(73) Assignee: G.D Societa per Azioni, Bologna (IT)

( * ) Notice: Subject to any disclaimer, the term of this patent is extended or adjusted under 35 U.S.C. 154(b) by 222 days.

(21) Appl. No.: 10/794,762

(22) Filed: Mar. 5, 2004

(65) Prior Publication Data

US 2004/0245068 A1 Dec. 9, 2004

(30) Foreign Application Priority Data

Mar. 6, 2003 (IT) .......................... BO2003A0122

(51) Int. Cl.
*B65G 25/00* (2006.01)
(52) U.S. Cl. .............. 198/803.1; 198/867.1; 198/607; 198/403
(58) Field of Classification Search ............. 198/803.1, 198/867.1, 607, 626.1, 461.2, 403
See application file for complete search history.

(56) References Cited

U.S. PATENT DOCUMENTS 2,997,157 A * 8/1961 Siebke .................... 198/803.7
3,394,931 A * 7/1968 Gavin ..................... 198/803.7
3,640,051 A * 2/1972 Cloud, Jr. .................... 53/546
3,793,706 A * 2/1974 Dohlen et al. ................ 29/559
3,868,009 A * 2/1975 Billi et al. ............... 198/461.2
4,726,876 A * 2/1988 Tomsovic, Jr. ............. 156/552
5,060,781 A * 10/1991 Santandrea et al. ...... 198/345.1
5,094,340 A * 3/1992 Avakov ................... 198/626.1
5,947,262 A * 9/1999 Boring et al. ............ 198/803.1
6,427,825 B1 * 8/2002 Biagiotti ................. 198/461.2
6,533,104 B1 * 3/2003 Starlinger-Huemer et al. ... 198/626.1

FOREIGN PATENT DOCUMENTS

DE 23 35026 1/1975

* cited by examiner

*Primary Examiner*—Gene O. Crawford
*Assistant Examiner*—Rashmi Sharma
(74) *Attorney, Agent, or Firm*—Ladas & Parry LLP

(57) ABSTRACT

A turn-around device for packets, in particular packets of cigarettes, wherein the packets are fed successively, with a first surface facing forwards, to a turn-around station, from which they are extracted, with a second surface facing forwards, by a gripper conveyor, which travels through the turn-around station perpendicularly to the second surface, and has a number of grippers, each of which defines a pocket for a relative packet, and closes gradually onto the packet to control its position as it is extracted from the turn-around station with the second surface facing forwards.

21 Claims, 4 Drawing Sheets

TURN-AROUND DEVICE FOR PACKETS

The present invention relates to a turn-around device for packets.

More specifically, the present invention relates to a turn-around device for packets of cigarettes, to which the following description refers purely by way of example.

Here and hereinafter, the term "turn-around device" is intended to mean a conveying device, to which the packets are fed successively with a first surface facing forwards, and off which the packets are fed successively with a second surface facing forwards and forming, with the first surface, an angle of normally 90° or a multiple of 90°.

BACKGROUND OF THE INVENTION

Known turn-around devices of the above type normally comprise an input conveyor operating in a first given direction and in a given travelling plane; and a toothed turn-around wheel rotating about an axis perpendicular to said travelling plane, and which engages the packets laterally and moves them, in the travelling plane, into a second direction normally crosswise to the first direction.

Turn-around devices of the above type have several drawbacks, mainly due to the fact that, as a tooth on the turn-around wheel strikes the side of a packet on the input conveyor, the packet is accelerated sharply crosswise, and not only has a tendency to be damaged by the relatively severe stress to which it is subjected, but is also detached by inertia from the relative tooth on the turn-around wheel, which thus loses position control of the packet, so that braking devices are required to bring the turned-around packets back under control.

SUMMARY OF THE INVENTION

It is an object of the present invention to provide a turn-around device for packets, whereby the packets are turned around without subjecting them to severe stress and, at the same time, without ever losing position control of the packets.

According to the present invention, there is provided a turn-around device for packets, as claimed in claim 1 and, preferably, in any one of the following claims depending directly or indirectly on claim 1.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
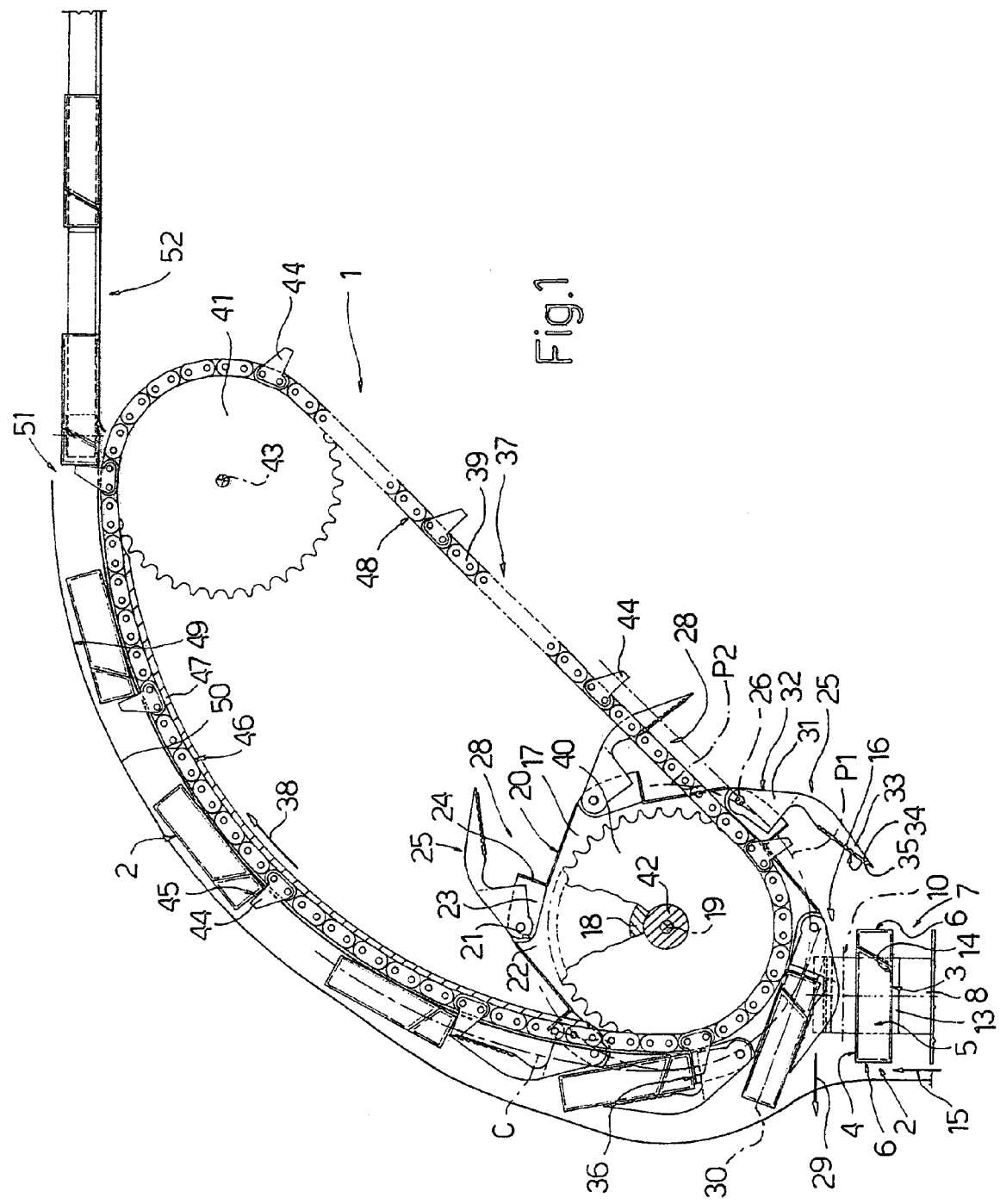
FIG. 1 shows a schematic plan view of a preferred embodiment of the turn-around device according to the present invention.

Number 1 in FIG. 1 indicates as a whole a turn-around device for turning around rigid, hinged-lid packets 2 of cigarettes, which are in the form of a rectangular parallelepiped, and are bounded by a front major lateral surface 3, a rear major lateral surface 4, two minor lateral surfaces 5, and two end surfaces 6.

Figure 3:
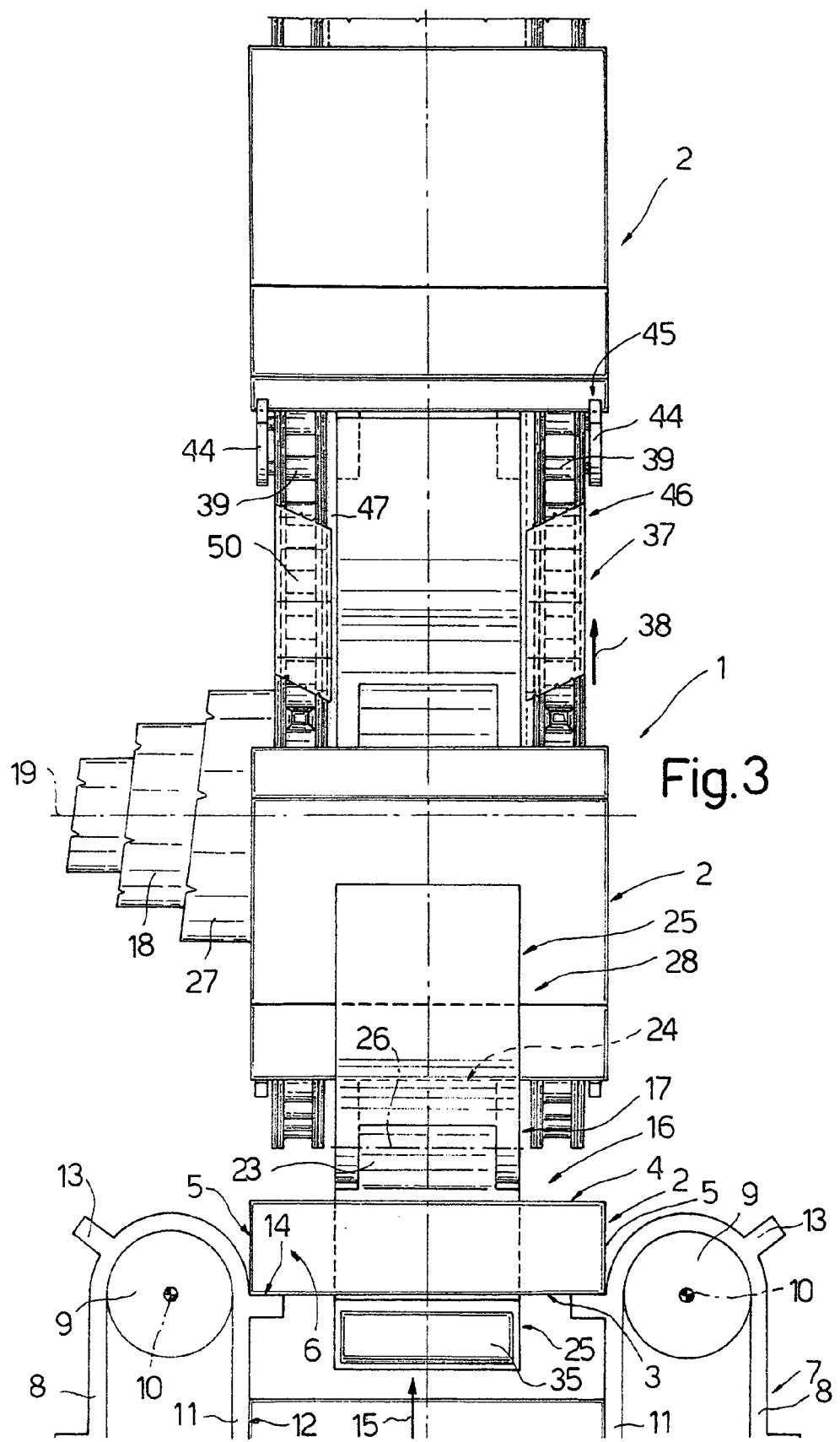
FIG. 3 shows a larger-scale side view of the FIG. 2 detail.

Turn-around device 1 comprises an input conveyor 7 which, as shown more clearly in FIG. 3, comprises two superimposed belts 8 looped about respective pulleys 9 (only one pulley 9 of each belt 8 is shown in FIG. 3) whose axes 10 are substantially horizontal in the example shown. Each belt 8 has a conveying branch 11 facing the conveying branch 11 of the other belt 8 to define a conveying channel 12 over the bottom belt 8, and has a succession of projections 13 which, along conveying channel 12, cooperate with corresponding projections 13 on the other belt 8 to define a succession of pockets 14 travelling, at a substantially constant speed V1 and in a travelling direction 15, towards an end of conveying channel 12 located at a turn-around station 16.

Each pocket 14 houses a packet 2 positioned on edge with its minor lateral surfaces 5 contacting respective conveying branches 11, with front major lateral surface 3 contacting the two rear projections 13 of relative pocket 14, and with rear major lateral surface 4 facing forwards in travelling direction 15 and a given distance from the two front projections 13 of relative pocket 14.

The end of input conveyor 7 facing turn-around station 16 is substantially tangent to the outer periphery of a rotary conveyor defined by a gripper wheel 17, which is fitted to a powered tubular shaft 18 crosswise to axes 10 to rotate, clockwise in FIG. 1, about an axis 19 of shaft 18.

Gripper wheel 17 has an outer profile in the form of a toothed polygon comprising a number of flat surfaces 20, each of which is connected to the front end of the following surface 20 by a curved, substantially radial surface 21 defining, with the end of the following surface 20, a curved tooth 22. A flat bracket 23 projects outwards from each surface 20, is adjacent to the relative tooth 22, is perpendicular to axis 19, and is bounded at the front by a surface 24 positioned radially with respect to axis 19. Each bracket 23 is inserted between the arms of a fastening fork of a respective jaw 25 which extends frontwards from relative bracket 23, faces relative surface 20, and oscillates on relative bracket 23, about a relative axis 26 parallel to axis 19 and by virtue of known cam actuating means 27 shown only partly in FIG. 3, to and from relative surface 20 to define, with relative surface 20 which acts as a fixed jaw, a relative gripper 28. Each gripper 28 is fed by shaft 18 along a circular path P1 extending through turn-around station 16, and at a speed V2 enabling gripper 28 to reach turn-around station 16 in time with a relative packet 2 fed to turn-around station 16 by input conveyor 7, and to engage, at turn-around station 16, the end of conveying channel 12 facing turn-around station 16, so as to grip relative packet 2 and remove it from input conveyor 7 in a direction 29 substantially perpendicular to travelling direction 15 and parallel to a longitudinal axis 30 of packet 2.

Figure 2:
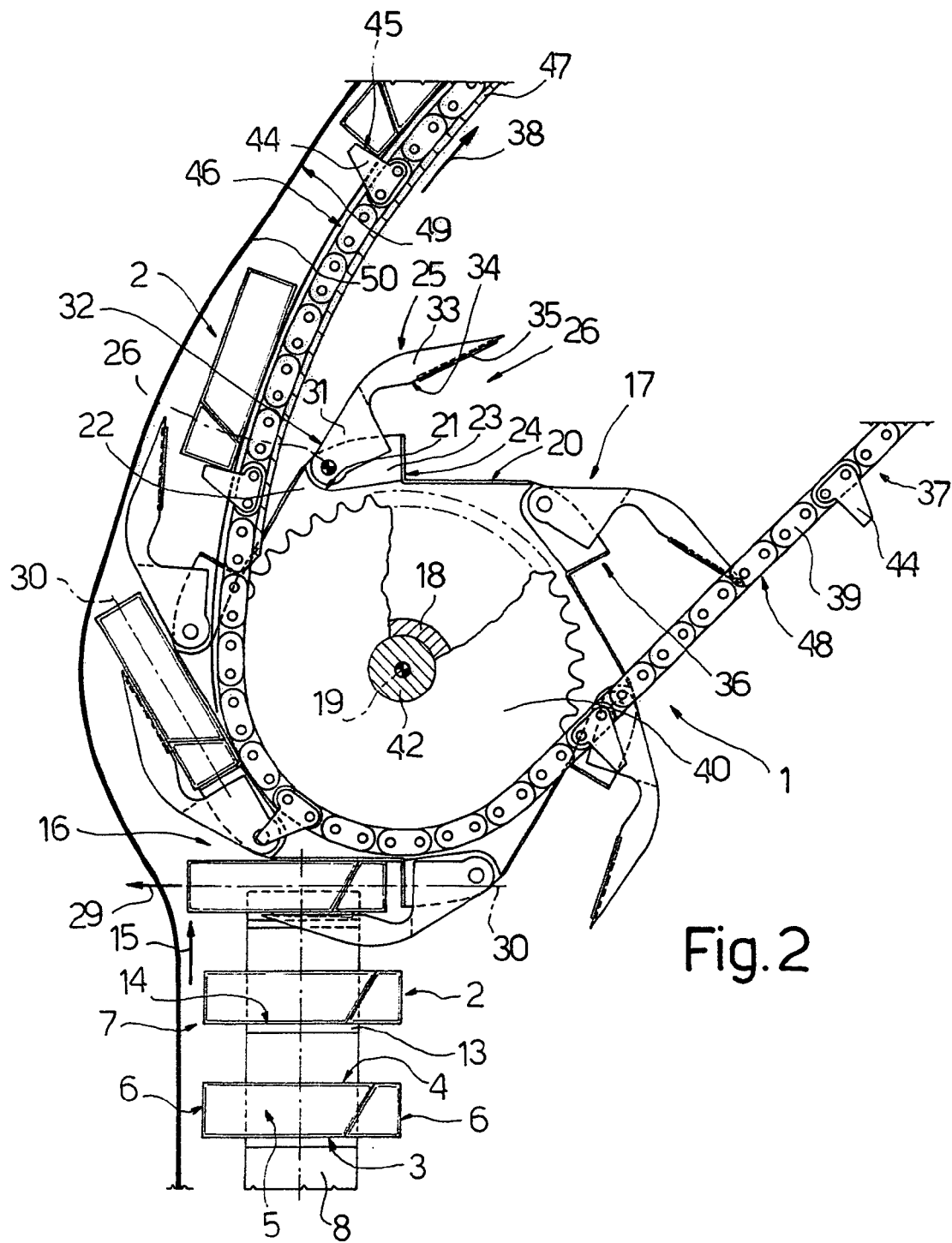
FIG. 2 shows a larger-scale view of a detail in FIG. 1 in a different operating position.
Figure 4:
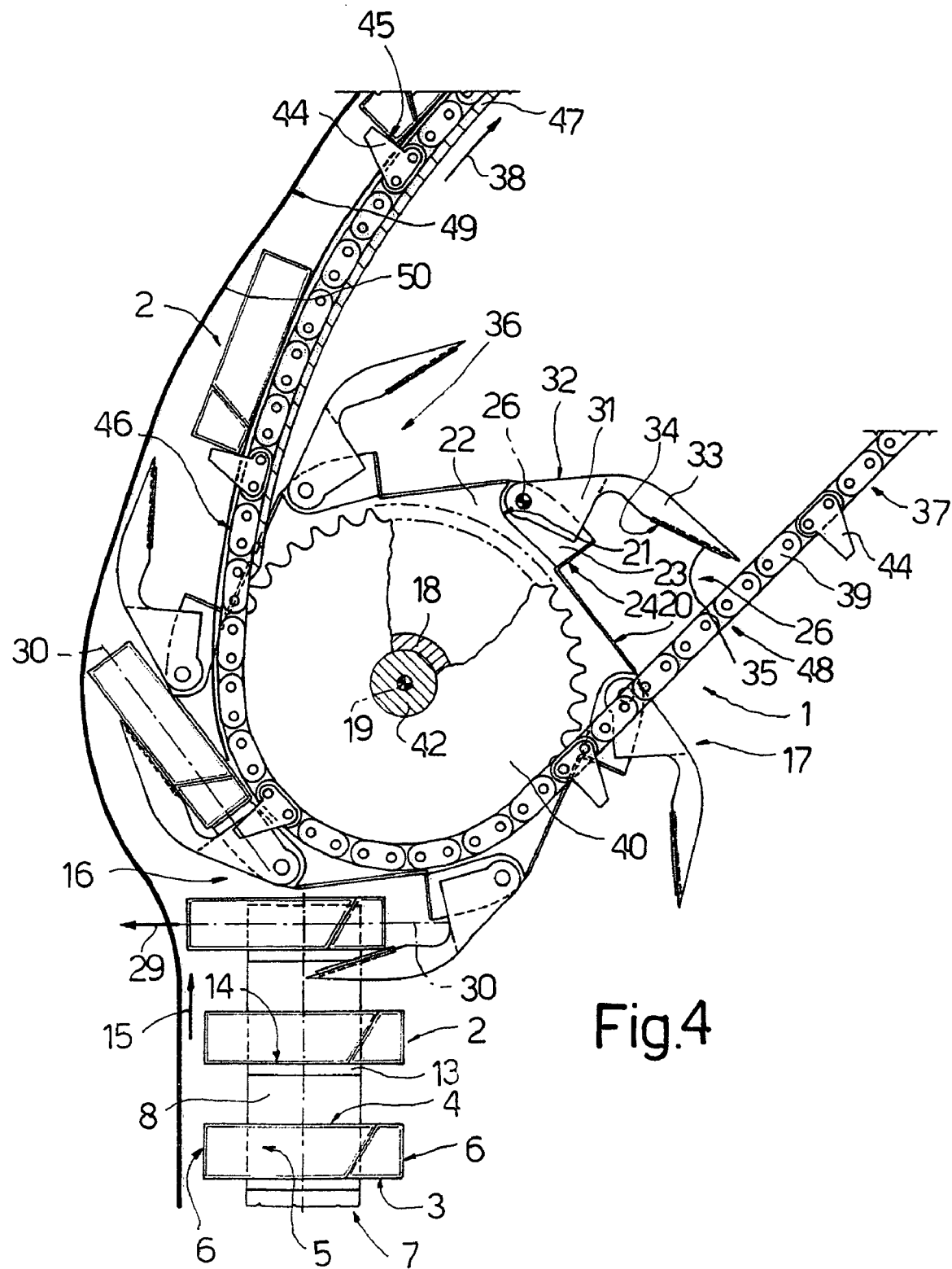
FIG. 4 is similar to FIG. 2, and shows the FIG. 2 detail in a further operating position.

As shown more clearly in FIGS. 2 and 4, each jaw 25 is narrower than major lateral surfaces 3 and 4 of packets 2, is equal in width to the thickness of gripper wheel 17, and comprises a first portion 31 hinged to relative bracket 23 and bounded externally by a flat surface 32 which is substantially coplanar with the following flat surface 20 when jaw 25 is open; and a second end portion 33 integral with a free end of relative first portion 31, angled with respect to relative first portion 31, and bounded towards the periphery of wheel 17 by a flat surface 34, which is covered with a pad 35 of elastomeric material, and is substantially parallel to the facing flat surface 20 when jaw 25 is closed, so as to define, with the facing flat surface 20, a U-shaped conveying pocket 36 bounded internally by relative flat surface 20, externally by relative pad 35, and at the back by surface 24 of relative bracket 23.

Turn-around device 1 also comprises an output conveyor 37 extending along a path P2, which extends through turn-around station 16 and about at least one pulley coaxial with axis 19, and comprises at least one portion C extending from turn-around station 16 and in common with path P1. Output conveyor 37 moves at a travelling speed V3 greater than V2 to extract packets 2 from relative grippers 28 and feed them longitudinally in any travelling direction 38.

In the example shown, output conveyor 37 comprises two parallel superimposed chains 39 located on opposite sides of gripper wheel 17 and looped about two pulleys defined respectively by a pair of toothed wheels 40 and a pair of toothed wheels 41; wheels 40 are fitted to a shaft 42 coaxial with axis 19 and fitted in rotary manner through shaft 18; and wheels 41 are drive wheels mounted to rotate, clockwise in FIG. 1 and at peripheral speed V3, about an axis 43 parallel to axis 19.

The two chains 39 are mounted apart by a distance smaller than the width of major lateral surfaces 3 and 4 of packets 2, and have respective successions of teeth 44 defining a succession of pockets 45, each for housing a respective packet 2. Wheels 40 and 41 define, on output conveyor 37, a conveying branch 46, which, in the example shown, is curved by running chains 39 along a curved guide plate 47 from turn-around station 16 to wheels 41; and a substantially straight return branch 48. When wheels 41 are activated, the pockets 45 along conveying branch 46 travel towards wheels 41 along a channel 49 defined by a guide plate 50 located outwards of conveying branch 46 and at a constant distance, just slightly greater than the thickness of packets 2, from conveying branch 46.

The output end of channel 49 is located at wheels 41 and at a transfer station 51 located along path P2, downstream from the portion C common with path P1. At transfer station 51, output conveyor 37 transfers packets 2 successively onto a further pocket conveyor 52, the input of which is located between wheels 41 and tangent to path P2 at transfer station 51.

In actual use, each packet 2 is fed, crosswise to its longitudinal axis 30, along input conveyor 7 in direction 15, and, as stated, with its rear major lateral surface 4 facing forwards.

Input conveyor 7 and gripper wheel 17 are synchronized so that a packet 2 arrives at turn-around station 16 simultaneously with a respective gripper 28, the jaw 25 of which is gradually inserted inside the output end of conveying channel 12. More specifically, as shown in FIG. 4, as a packet 2 reaches turn-around station 16 and gradually engages pocket 36 of relative gripper 28, jaw 25 of said pocket 36 begins closing, and the relative pad 35 slides gradually along relative packet 2 to begin moving packet 2 in direction 29, and imparts acceleration to the packet, which is only eliminated when packet 2 contacts surface 24 of relative bracket 23 and assumes speed V2. Only at this point does jaw 25 grip relative packet 2 firmly onto relative surface 20, remove it completely from turn-around station 16, and convey it axially at speed V2, with an end surface 6 facing forwards.

At this point, each packet 2 may be released at any point along path P1 to any receiving member, which would receive packet 2 oriented in any direction, but with said end surface 6 facing forwards, i.e. in a feed position turned 900 with respect to the feed position of packet 2 along input conveyor 7.

In the embodiment shown in the accompanying drawings, once past turn-around station 16 and along common portion C of paths P1 and P2, a respective pair of teeth 44 catch up with each packet 2 and engage respective portions of packet 2 projecting laterally from respective pocket 36. At the same time, relative jaw 25 opens to enable said teeth 44, which travel at speed V3 greater than V2, to extract packet 2 from relative pocket 36 and feed it in direction 38 into a relative pocket 45. As shown more clearly in FIG. 2, as packet 2 is being extracted from relative pocket 36 by relative teeth 44, the adjacent front jaw 25, which is already fully open, defines, with its outer surface 32 aligned with flat surface 20 of the following pocket 36, a chute for assisting position control and extraction of each packet 2 from relative pocket 36.

Once released by relative gripper 28, each packet 2 proceeds along channel 49 inside relative pocket 45 to conveyor 52, which in certain cases may be eliminated.

Grippers 28 therefore provide not only for extremely accurate position control of each packet 2 as it is being turned around, but also for gradually accelerating each packet 2 in the extraction direction 29 from input conveyor 7, thus safeguarding the packet against harmful inertial forces.

The invention claimed is:

1. A turn-around device for packets (2), each of which is in the form of a rectangular parallelepiped and is bounded by two first surfaces (4) parallel one to the other, and by two second surfaces (6) parallel one to the other and perpendicular to the two first surfaces (4); the device (1) comprising a turn-around station (16);

a first conveyor (7) for feeding said packets (2) successively to said turn-around station (16) in a first direction (15) and with a first surface (4) of each packet facing forwards;

a second conveyor (17) operated synchronously with said first conveyor (7) and for extracting said packets (2) from said turn-around station (16) with a second surface (6) of each packet facing forwards, and in a second direction (29) crosswise to said first direction (15); wherein said second conveyor (17) is a gripper conveyor travelling through said turn-around station (16) at a given speed (V2) and in said second direction (29), and comprising a number of grippers (28), each of which defines a pocket (36) for a relative packet (2), and closes gradually onto the relative packet (2) to control its position as it is extracted from the turn-around station (16) with said second surface (6) facing forwards;

a third conveyor (37) travelling through said turn-around station (16) with said second conveyor (17) and at a speed (V3) greater than that of the second conveyor (17); wherein said second and said third conveyor (17, 37) travel respectively along a first and a second path (P1, P2) having at least one common portion (C) extending downstream from said turn-around station (16); and wherein said third conveyor (37) engages each said packet (2) along said common portion (C), and extracts it from the respective said gripper (28) with said second surface (6) facing forwards; and a fourth conveyor (52) tangent to said third conveyor (37) at a transfer station (51) located downstream from said common path portion (C); wherein said fourth conveyor (52) is a pocket conveyor for successively receiving said packets (2) from said third conveyor (37) at said transfer station (51).

2. A turn-around device as claimed in claim 1, wherein each said packet (2) is substantially in the form of a rectangular parallelepiped comprising two major lateral surfaces (3, 4), two minor lateral surfaces (5), and two end surfaces (6); said first surface (4) being a said major lateral surface, and said second surface (6) being a said end surface.

3. A turn-around device as claimed in claim 1, wherein said second conveyor (17) comprises a wheel (17) rotating about an axis (19) crosswise to said first and said second direction (15, 29), and having a polygonal outer profile comprising a number of flat surfaces, each of which defines a fixed first jaw (20) of a respective said gripper (28), and moves through said turn-around station (16) in said second direction (29); each said gripper (28) defining a U-shaped pocket (36) for a respective said packet (2), and also comprising a second jaw (25) facing the relative said first jaw (20) and movable, with respect to the relative first jaw (20), between an open position and a closed position respectively opening and closing the respective said pocket (36).

4. A turn-around device as claimed in claim 3, wherein each said second jaw (25) is hinged on said wheel (17) to a rear end, in the rotation direction of said wheel (17), of the relative said first jaw (20).

5. A turn-around device as claimed in claim 4, wherein each said second jaw (25) is hinged to a relative bracket (23) projecting outwards from said wheel (17) and defining a back surface (24) of the relative said pocket (36).

6. A turn-around device as claimed in claim 3, wherein each said second jaw (25) comprises a first portion (31) hinged to said wheel (17) and bounded externally by a flat surface (32) which is substantially coplanar with said first jaw (20) of the following gripper (28) when said second jaw (25) is in said open position; and a second end portion (33) integral with a free end of the relative said first portion (31), and bounded towards the periphery of said wheel (17) by a flat surface (34) which is substantially parallel to the relative said first jaw (20) when said second jaw (25) is in said closed position.

7. A turn-around device as claimed in claim 6, wherein each said gripper (28) comprises a pad (35) of elastomeric material on said flat surface (34) of said second portion (33) of the relative said second jaw (25).

8. A turn-around device as claimed in claim 3, wherein said third conveyor (37) is an endless conveyor looped about a first and a second pulley having axes (19, 43) parallel to each other; said first pulley being coaxial with said wheel (17).

9. A turn-around device as claimed in claim 8, wherein each said pulley comprises two coaxial toothed wheels (40; 41); the toothed wheels (40) of said first pulley being located on opposite sides of said wheel (17); and said third conveyor (37) comprising two chains (39), each of which is looped about a respective pair of said toothed wheels (40, 41), and has a respective succession of teeth (44) for engaging respective said packets (2).

10. A turn-around device for packets (2), each of which is in the form of a rectangular parallelepiped and is bounded by two first surfaces (4) parallel one to the other, and by two second surfaces (6) parallel one to the other and perpendicular to the two first surfaces (4); the device (1) comprising:
a turn-around station (16);
a first conveyor (7) for feeding the packets (2) successively to the turn-around station (16) in a first direction (15) and with one of the two first surfaces (4) of each packet (2) facing forwards;
a second conveyor (17) operated synchronously with the first conveyor (7) and for extracting the packets (2) from the turn-around station (16) with one of the two second surfaces (6) of each packet (2) facing forwards, and in a second direction (29) crosswise to the first direction (15); wherein the second conveyor (17) is a gripper conveyor rotating about a first axis (19), travels through the turn-around station (16) at a given speed (V2) and in the second direction (29), and comprises a number of grippers (28), each of which defines a pocket (36) for a relative packet (2), and closes gradually onto the relative packet (2) to control its position as it is extracted from the turn-around station (16) with said one of two second surfaces (6) facing forwards; and
a third conveyor (37) travelling through the turn-around station (16) with the second conveyor (17) and at a speed (V3) greater than that of the second conveyor (17); wherein the second and the third conveyor (17, 37) travel respectively along a first and a second path (P1, P2) having at least one common portion (C) extending downstream from the turn-around station (16); and wherein the third conveyor (37) engages each packet (2) along the common portion (C), and extracting the packet (2) from the respective gripper (28) with said one of two second surfaces (6) facing forwards;
wherein the third conveyor (37) comprises: a first pulley (40) rotating about the first axis (19) and coaxial with the second gripper conveyor (17); a second pulley (41) located at a transfer station (51) and rotating about a second axis (43) parallel to the first axis (19); and a flexible element (39) looped about the two pulleys (40, 41) and having a successions of teeth (44), each of which defines a pocket (45) for housing a respective packet (2) and pushes the respective packet (2) out of a relevant gripper (28) of the second conveyor (17).

11. A turn-around device as claimed in claim 10, wherein each packet (2) comprises two major lateral surfaces (3, 4), two minor lateral surfaces (5), and two end surfaces (6); the two first surfaces (4) are the major lateral surfaces, and the two second surface (6) are the end surfaces.

12. A turn-around device as claimed in claim 10, wherein the second conveyor (17) comprises a wheel (17) rotating about an axis (19) crosswise to the first and the second direction (15, 29), and having a polygonal outer profile comprising a number of flat surfaces, each of which defines a fixed first jaw (20) of a respective gripper (28), and moves through the turn-around station (16) in the second direction (29); each gripper (28) defining a U-shaped pocket (36) for a respective packet (2), and also comprising a second jaw (25) facing the relative first jaw (20) and movable, with respect to the relative first jaw (20), between an open position and a closed position respectively opening and closing the respective pocket (36).

13. A turn-around device as claimed in claim 12, wherein each second jaw (25) is hinged on the wheel (17) to a rear end, in the rotation direction of the wheel (17), of the relative first jaw (20).

14. A turn-around device as claimed in claim 13, wherein each second jaw (25) is hinged to a relative bracket (23) projecting outwards from the wheel (17) and defining a back surface (24) of the relative pocket (36).

15. A turn-around device as claimed in claim 12, wherein each second jaw (25) comprises a first portion (31) hinged to the wheel (17) and bounded externally by a flat surface (32) which is substantially coplanar with the first jaw (20) of the following gripper (28) when the second jaw (25) is in the open position; and a second end portion (33) integral with a free end of the relative first portion (31), and bounded towards the periphery of the wheel (17) by a flat surface (34) which is substantially parallel to the relative first jaw (20) when the second jaw (25) is in the closed position.

16. A turn-around device as claimed in claim 15, wherein each gripper (28) comprises a pad (35) of elastomeric material on the flat surface (34) of the second portion (33) of the relative second jaw (25).

17. A turn-around device as claimed in claim 12, wherein the third conveyor (37) is an endless conveyor looped about a first and a second pulley having axes (19, 43) parallel to each other; the first pulley being coaxial with the wheel (17).

18. A turn-around device as claimed in claim 17, wherein each pulley comprises two coaxial toothed wheels (40; 41); the toothed wheels (40) of the first pulley being located on opposite sides of the wheel (17); and the third conveyor (37) comprising two chains (39), each of which is looped about a respective pair of the toothed wheels (40, 41), and has a respective succession of teeth (44) for engaging respective packets (2).

19. A turn-around device as claimed in claim 10, and comprising a fourth conveyor (52) tangent to the third conveyor (37) at the transfer station (51) located downstream from the common path portion (C); the fourth conveyor (52) being a pocket conveyor for successively receiving the packets (2) from the third conveyor (37) at the transfer station (51).

20. A turn-around device as claimed in claim 10, wherein the flexible element (39) comprises two parallel superimposed chains (39), which are located on opposite sides of the second gripper conveyor (17) and are mounted apart by a distance smaller than the width of the packets (2).

21. A turn-around device as claimed in claim 10, wherein the flexible element (39) has a conveying branch (46) extending from the turn-around station (16) to the transfer station (51), and a return branch (48) extending from the transfer station (51) to the turn-around station (16); the conveying branch (46) is curved by running the flexible element (39) along a curved guide plate (47), and the return branch (48) is substantially straight.

* * * * *